United States Patent [19]

Pickholtz

[11] Patent Number: 4,593,353

[45] Date of Patent: Jun. 3, 1986

[54] SOFTWARE PROTECTION METHOD AND APPARATUS

[75] Inventor: Andrew Pickholtz, Fairfax, Va.

[73] Assignee: Telecommunications Associates, Inc., Fairfax, Va.

[21] Appl. No.: 315,050

[22] Filed: Oct. 26, 1981

[51] Int. Cl.$^4$ ............................................. G06F 12/14
[52] U.S. Cl. ....................................................... 364/200
[58] Field of Search .............. 364/200, 900, 300, 144; 178/22

[56] References Cited

U.S. PATENT DOCUMENTS

| | | | |
|---|---|---|---|
| 3,609,697 | 9/1971 | Blevins | 364/200 |
| 3,806,882 | 4/1974 | Clarke | 364/200 |
| 3,996,449 | 12/1976 | Attanasio et al. | 235/61.7 R |
| 4,118,789 | 10/1978 | Casto et al. | 364/900 |
| 4,120,030 | 10/1978 | Johnstone | 364/200 |
| 4,168,396 | 9/1979 | Best | 178/22 |
| 4,238,854 | 12/1980 | Ehrsam et al. | 178/22.16 |
| 4,446,519 | 5/1984 | Thomas | 364/300 |

OTHER PUBLICATIONS

IBM Technical Disclosure Bulletin, "Internal Key Generation for Block Ciphers", vol. 23, No. 7B, Dec. 1980.

IBM Technical Disclosure Bulletin, "Data Encryption in a Digital Communication System", vol. 22, No. 2, Jul. 1979.

Primary Examiner—Thomas M. Heckler
Attorney, Agent, or Firm—David B. Newman, Jr.

[57] ABSTRACT

In a method of and apparatus for limiting program execution to only an authorized data processing system, a proprietary program, together with first and second authorization codes, is stored on a magnetic disc or other storage medium. The first and second authorization codes are read. A hardware module containing a pseudorandom number generator unique to the authorized system receives the first authorization code as a key. The resultant number generated by the number generator, which is a function of the key and particular pseudorandom generator algorithm, is compared with the second authorization code in direct or encrypted form. An execution enable signal is generated in response to a positive comparison to enable the stored program to be executed.

2 Claims, 3 Drawing Figures

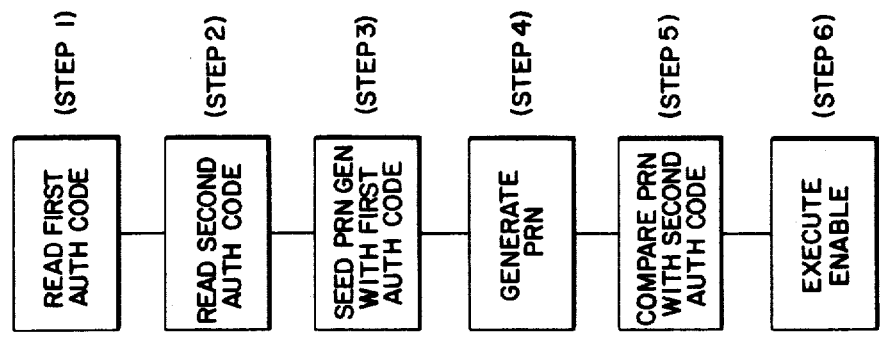
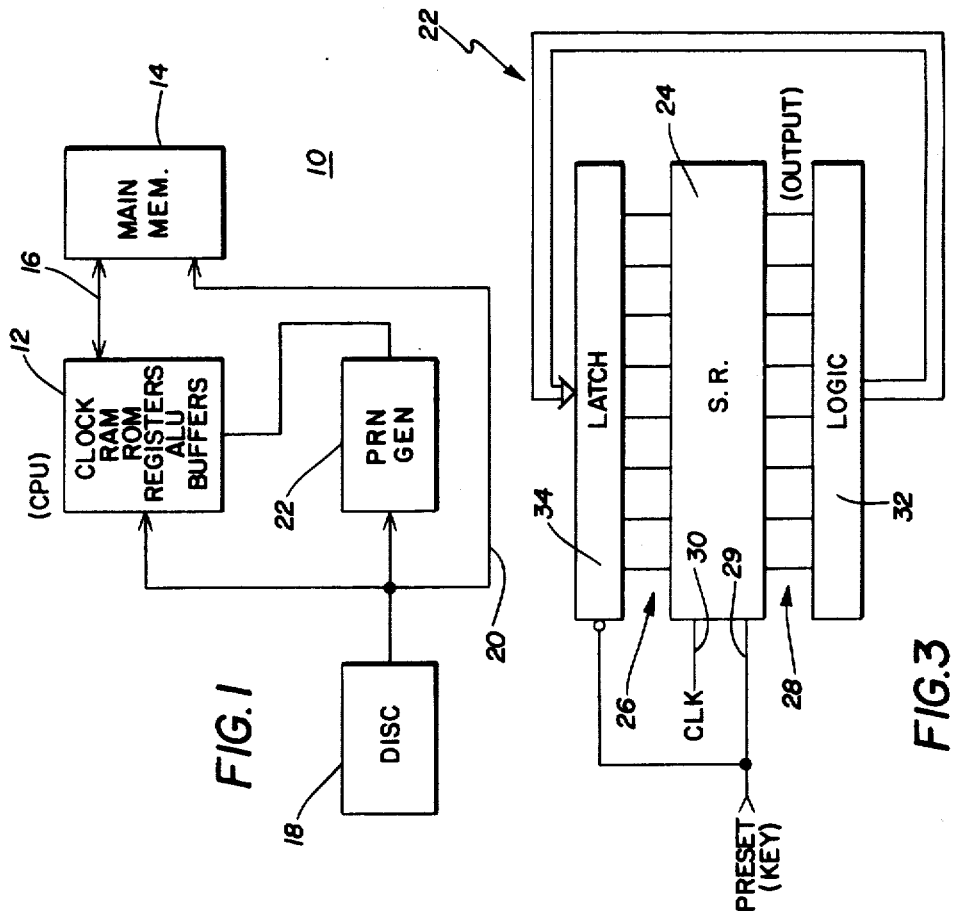

SOFTWARE PROTECTION METHOD AND APPARATUS

TECHNICAL FIELD

The present invention relates generally to software protection, and more particularly toward a method of and apparatus for enabling execution of software with only a data processing system authorized to execute the software. The software protection method and apparatus are particularly useful in a microprocessor based environment.

BACKGROUND ART

Software piracy is rapidly becoming a major problem in data processing and particularly in the personal computer field. Software development for microcomputers, for example, is expensive and time consuming. It is therefore important to the software developer that each authorized user pay for the programs used and not reproduce the programs to be used by others or at other sites. Software piracy is, in practice, difficult to prevent because it is generally easy for users to make multiple copies of the programs for unauthorized users, and easy for competitors to repackage and distribute valuable programs at a fraction of the cost to the original developer. The problem is aggravated by the existence of microcomputers which are becoming widespread.

A number of different types of encryption methods have been provided to attempt to eliminate software piracy. One method involves providing a ROM containing an identification number that is duplicated on a floppy disc containing a program to be executed. The program periodically checks for the presence of the identification ROM. If the identification ROM is not connected in the system during execution of the program, the program crashes.

In a related method, a hardware module or "black box" is connected in a personal computer. Each piece of software is supplied with a magnetic key that physically plugs into the module and contains a coded identification number that matches the identification number on the software. To decode the stored program, the key must be plugged into the module.

In another method, a ROM produces a sequence of executable codes in the normal manner but prohibits the user from randomly accessing the memory addresses. A secret executive routine, built into the ROM, contains a table of the legal next steps for every given step in the program. Only those steps listed in the table can be accessed by the user. Thus, if a program contains a branch to one of two places, only those two places can be examined by the programmer at that time. If a program contains enough branches, it will be virtually impossible for the user to run through every permutation of the program to obtain a complete listing of the code.

Another prior art encryption method is monoalphabetic substitution, wherein each byte of a program is replaced with a substitute byte. Each byte of the enciphered program is deciphered when needed by simple table look-up using a small substitution table that is part of the circuitry on the microprocessor chip.

In some methods, the format of the data on the storage disc is altered by changing data locations. This makes it impossible, however, for authorized users to make backup copies.

All of the software protection systems of which I am aware are either not sufficiently secure against cryptanalyst attack, require too much space on the microprocessor chip or are too slow. Further, hardware based systems for software protections of which I am aware require a separate hardware module for each software package that, of course, substantially increases costs and decreases versatility.

Accordingly, one object of the invention is to provide a new and improved method of and apparatus for protecting software against unauthorized use.

Another object is to deter users of microprocessor programs from executing the programs in unauthorized computers.

Another object is to provide software protection that is fast and occupies minimum chip area.

Another object is to provide software protection that is substantially secure against software piracy without significantly adding to software costs.

Another object is to provide a software protection system wherein authorized users are able to make backup copies which are secure from use in unauthorized sites.

DISCLOSURE OF INVENTION

In a computer software protection method and apparatus, in accordance with the invention, first and second authorization codes are recorded on a magnetic disc or other storage medium carrying proprietary software that is to be implemented in only an authorized data processing system. The first and second authorization codes are read prior to program execution. The first authorization code is supplied as an encryption key to a pseudorandom generator provided in a hardware module connected in circuit with the data processing system. The pseudorandom number generator performs a pseudorandom number generation algorithm unique to the authorized data processing system, and the resultant number is compared with the second authorization code. If there is a favorable comparison, an execute enable signal is generated to enable the software to be executed in the system.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various, obvious respects, all without departing from the invention. Accordingly, the drawings and description are to be regarded as illustrative in nature, and not as restrictive.

BRIEF DESCRIPTION OF THE DRAWING

FIG. 1 is a block diagram representation of a computer system including software protection, in accordance with the present invention;

FIG. 2 is a flow chart explaining the operation of the software protection system; and FIG. 3 is a circuit diagram showing an example of a pseudorandom number generator as used in FIG. 1.

BEST MODE OF THE INVENTION

Referring to FIG. 1, a computer system designated generally by 10 comprises a conventional central processing unit (CPU) 12 in communication with a main memory 14 over a standard data channel 16. Software stored in a disc 18 or similar device is applied to main memory 14 over channel 20 under control of CPU 12. CPU 12 and main memory 14 are preferably components of a computer system based, for example, upon conventional microprocessor architecture, such as the 8008, M6800, Z-80, etc. Of course, the system could also be based upon larger scale architecture. Other components, such as bus drivers, etc. have been omitted from FIG. 1 for simplicity. Operation of such a system is described in detail in a number of available references, such as Soucek, Branko, *Microprocessors and Microcomputers*, John Wiley & Sons, Inc. (1976). Another useful reference which goes into detail on various commercially available microprocessors is Rao, Guthikonda, *Microprocessors and Microcomputer Systems*, Van Nostrand Reinhold Company (1978). Generally, microprocessors contain bus-oriented architecture that requires a minimum of hardware for peripheral support. The microprocessor, which is basically the CPU, and support that goes with it is generally provided on a single printed circuit board as a dedicated microcomputer system. A read only memory (ROM) contains instructions that are decoded and executed by various circuitry constituting the microprocessor. A clock generator, typically crystal-controlled, supplies timing and synchronization. An arithmetic and logic unit (ALU) performs arithmetic and logic operations on data stored in registers. The registers provide temporary access of data transferred between external memory 18 and internal temporary data storage in the form of random access memory (RAM), often part of the microprocessor. Input/output buffers provide timing and multiplexing of instructions and data to the random access memory and write data and instructions to the RAM or external memory.

To enable execution of software stored on external memory or disc 18 within CPU 12, a pseudorandom sequence or number generator (referred to hereinafter as a pseudorandom number generator, or PRN) 22 responds to data stored together with proprietary software on disc 18 to determine whether execution of the software is authorized on the particular data processing system 10. Thus, stored on disc 18 together with the proprietary software are a first authorization code and a second authorization code. The first and second authorization codes may be in the form of digital words having no apparent relationship to each other. In basic principle, the first authorization code is applied to PRN 22 as an encryption key or "seed". The seed is manipulated in accordance with the particular pseudorandom number generating algorithm associated with PRN 22 to obtain a resultant number that is compared in CPU 12 with the second authorization code read from disc 18.

Pseudorandom number generators are well known in the prior art. These generators are typically formed by shift registers having suitable feedback between various output stages and the input. Pseudorandom sequences are characterized by sequences of long strings of numbers that appear as noise within portions of the string but repeat in the same order every time the string starts over. The registers are initiated by the seed or encryption key and will thereafter generate the same sequence of numbers, depending upon the algorithm or particular feedback logic incorporated in the generator. A discussion of pseudorandom sequencers including examples of a number of different types of sequencers is given in Lancaster, Don, *TTL Cookbook*, Howard W. Sampson Co., Inc. (1974) at pages 277-283 and *Shift Register Sequences*, Golomb, Soloman, Holden-Day, Inc., San Francisco (1967).

Referring to FIG. 3, one type of pseudorandom number generator that may be used as PRN 22 in FIG. 1 comprises a shift register 24 formed of a sequence of flip flops having a number of data input lines 26 and a corresponding number of data output lines 28 together with a clock line 30 that shifts data stored between stages of the shift register. The outputs 28 of shift register 24 are applied to a logic network 32 which may comprise a number of exclusive OR gates or other logic elements that operate on two or more of the shift register outputs and apply the resultant to the register inputs through latch 34. For example, logic network 32 may comprise a single exclusive OR gate having inputs connected to a preselected pair of register outputs and a gate output connected to the input of the first stage of the shift register 24. This logic arrangement will provide a relatively short string of data at register outputs 28. Additional gates, however, are incorporated within logic network 32 in a manner described in the Lancaster text to provide longer nonrepetitive sequences or strings of data. The strings have maximal lengths of $2^n - 1$, where n is the number of shift register stages. Thus, for example, a 16-stage shift register can provide a nonrepeating sequence or string of data of 65,535 bits.

The purpose of latch 34 is to apply feedback bits to the shift register 24 inputs during a recirculation mode of operation of the generator 22. During a seed mode, however, when the first authorization code is applied as an encryption key to the register, the latch 34 inhibits any bits at the outputs 28 of the shift register from being applied to inputs 26 of the register. The latch 34 is thus OFF when data are applied to preset input (key) 29.

Referring to FIG. 2, a software execute authorization routine using PRN generator 22 involves, in step 1, reading the first authorization code from disc 18 and reading the second authorization code (step 2) from the disc. The first authorization code is arbitrarily selected as any number; the second authorization code is derived from a particular PRN generator 22 associated with the authorized data processing system 10. As discussed earlier, the particular PRN algorithm associated with generator 22 is unique to the system. It is supplied to the microcomputer user to to be installed on site, and a record of the PRN generator algorithm associated with that authorized system is maintained by the software supplier or other entity. The second code stored on disc 18 is determined as a function of the arbitrary first authorization code and the PRN algorithm unique to the authorized system 10. The authorization code in practice is generated by providing a generator or an emulation of a generator having an identical algorithm to PRN generator 22 and seeding that generator or emulation with the first authorization code stored on disc 18. The PRN generator at the recording site develops a predetermined portion of the sequence as the second authorization code to be recorded on disc 18. For example, assuming that the PRN sequence or string is 262,143 bits (18-stage shift register with stages 11 and 18 being EXCLUSIVE ORed to feed the shift register input), the last eight bits of the sequence, or any other eight bits, may be selected as an eight bit second authorization code. The resultant second authorization code is compared with the stored second authorization code read from disc 18 (step 5) and if there is a positive comparison, an execute enable signal (step 6) is generated by PRN generator 22 or by the software to CPU 12.

Any subsequent software supplied to the user of authorized data processing system 10 will carry different first and second authorization codes related to the same PRN sequence associated with the generator 22 of that user. The software stored on disc 18 will not be executable on other data processing systems since only the authorized system 10 is provided with the particular generator 22 that generates the correct second authorization code following encryption keying of the first authorization code in the aforementioned manner.

In this disclosure, there is shown and described only the preferred embodiment of the invention, but as aforementioned, it is to be understood that the invention is capable of use in various other combinations and environments and is capable of changes or modifications within the scope of the inventive concept as expressed herein. For example, it is to be understood that other types of pseudorandom generators may be provided in addition to the one described in detail above. The comparison step, in step 5, may be provided by conventional hardware (not shown) or can be provided by CPU 12 using standard software. The PRN generator 22 may be encased in plastic or epoxy to prevent piracy by inspection and may be further embedded with X radiation opaque particles to prevent identification of the PRN algorithm by radiographic inspection. Further, by implementing the PRN algorithm using software, rather than in a discrete generator 22, it is possible to render the algorithm reasonably inaccessible by essentially "burying" the routine within the software; the software routines which implement the steps in FIG. 2 can also be "buried" with the software. Also, the first authorization code may be scrambled prior to application to seed the generator 22 of software emulation thereof; the resultant PRN is then similarly scrambled to provide a positive comparison.

I claim:

1. A software protection apparatus using first and second authorization codes and a pseudorandom number, said software protection apparatus for use with a computer, comprising:
   an external memory device having computer software and a first authorization code and a second authorization code at selected data locations, wherein said second authorization code is part of a pseudorandom sequence;
   means for reading said external memory device, said reading means located in the computer;
   pseudorandom number generator device located in the computer and coupled to said reading means, for generating a pseudorandom number in response to said reading means reading said first authorization code from said external memory device, said first authorization code being read prior to execution of said computer software, said pseudorandom number generator device including a sealed casing, thereby preventing identification of the pseudorandom number generator algorthim;
   processing means located in the computer and coupled to said reading means and said pseudorandom number generator device, for comparing the pseudorandom number generated by said pseudorandom number generator device with the second authorization code read from selected data locations in said external memory device, said processing means generating an enable signal in response to a positive comparison of the pseudorandom number with the second authorization code for enabling execution of the computer software stored in said external memory device.

2. The software protection apparatus in claim 1 wherein said external memory device includes a floppy disc.

* * * * *